Figure 1:
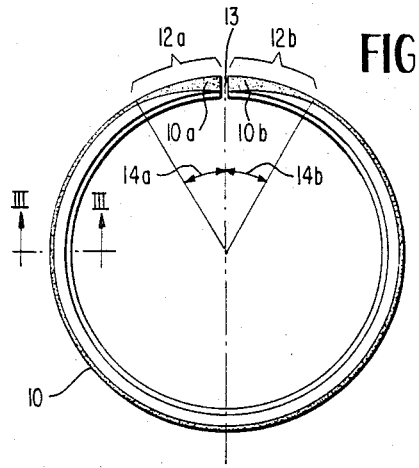

Dec. 3, 1968  E. SCHMIDT  3,414,277
TORSION PISTON RING
Filed Jan. 5, 1965

INVENTOR
ERHARD SCHMIDT

BY  Dicke + Craig
ATTORNEYS

United States Patent Office 3,414,277
Patented Dec. 3, 1968

3,414,277
TORSION PISTON RING
Erhard Schmidt, Nurtingen, Germany, assignor to Daimler-Benz Aktiengesellschaft, Stuttgart-Unterturkheim, Germany
Filed Jan. 5, 1965, Ser. No. 423,516
Claims priority, application Germany, Jan. 10, 1964, D 43,320
13 Claims. (Cl. 277—214)

The present invention relates to a torsion piston ring provided with a concentrically extending material recess along at least one of the surfaces meeting at the inner upper corner of the originally rectangular cross-sectional area of the ring. Such types of piston rings with grooves extending over the entire circumference in the upper flank surface of the ring or with beveled surfaces at the inner upper edge of the ring are known in the prior art. They exhibit, by reason of the asymmetric cross section thereof, during stressing a torsional effect benefitting the sealing thereof.

However, it has been discovered that in the proximity of the abutment or joint ends, where the resistance against torsion becomes smaller, variations and deviations occur in operation in the torsional behavior of the ring, probably in conjunction with vibrations, so that undesirable wear and possibly also failure and breakage of the ring may be the result.

According to the present invention this is avoided in that the material recesses are displaced within the area of the abutment or joint ends toward the inner lower part of the cross-sectional surfaces of the ring. One achieves in this manner in the direction toward the abutment or joint ends an effect opposing the torsional effect in the remaining part of the ring so that the aforementioned undesirable appearances can no longer occur or only to a very reduced extent.

If the rings in question are rings which are provided with a material recess cutting into the upper flank surfaces thereof, then the present invention may be realized in that the material recess terminates ahead of the abutment or joint ends, especially in a gradual manner, and that instead a corresponding material aperture cutting into the lower flank surfaces of the ring extends up to the abutment or joint ends.

A particularly advantageous construction results if the material recess extends as a groove exclusively along the inner surface of the ring. Such a groove in accordance with the present invention, producing the torsional effect, already possesses as such the great advantage that the upper abutment surface of the ring at the flank of the piston-ring groove is not reduced thereby. Furthermore, the "torsion groove" may be laid out continuously and smoothly toward the abutment or joint ends from the upper area toward the lower area of the inner surfaces of the ring. In particular, the area within which the groove extends obliquely downwardly may correspond to a sector angle of between 10° and 40°, as measured from the ring joint.

Accordingly, it is an object of the present invention to provide a torsional piston ring of the type described above which effectively eliminates by simple means the shortcomings and drawbacks encountered with the prior art constructions.

Another object of the present invention resides in the provision of a torsion piston ring which eliminates undesirable wear and possibly failures as a result of the ruptures liable to occur with the prior art constructions.

Still a further object of the present invention resides in the provision of a torsion piston ring having a material recess or recesses so arranged and constructed as to produce within the area of the abutment or joint ends of the ring an effect opposing the torsional effect within the remaining part of the ring so as to minimize wear.

Still another object of the present invention resides in the provision of a torsional piston ring of the type described above which not only can be readily manufactured by simple and inexpensive means but which also avoids reducing the abutment surfaces of the ring which abut against the groove flanks of the piston ring.

Figure 2:
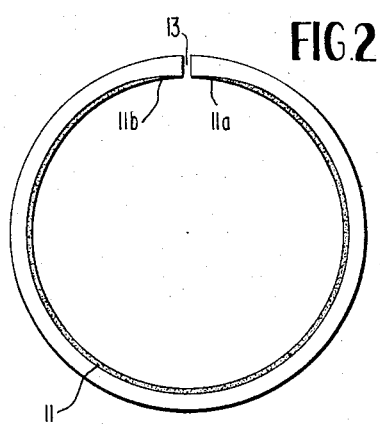
Figure 3:
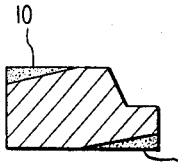

These and other objects, features and advantages of the present invention will become more obvious when taken in connection with the accompanying drawing which shows, for purposes of illustration only, several embodiments in accordance with the present invention, and wherein:

FIGURE 1 is a top plan view on a torsion piston ring of conventional construction, FIGURE 2 is a bottom plan view on the piston ring of FIGURE 1, FIGURE 3 is a cross-sectional view on an enlarged scale, taken along line III—III of FIGURE 1, and FIGURES 4 through 7 illustrate enlarged axial cross-sectional views through four embodiments of torsion piston rings in accordance with the present invention.

With a conventional torsion piston ring, the torsional effect (in the clock-wise direction in FIGURE 3) has as a result that the upper flank surface of the ring bears and wears at 10 and the lower flank surface of the ring at 11. Within the areas of 12a and 12b, that is, over the sector angle 14a and 14b of about 30° adjacent the joint 13, the bearing or wear surfaces 10a and 10b of the upper flank surface become noticeably wider toward the abutment or joint ends whereas corresponding bearing or wear surfaces 11a and 11b at the lower flank surface become increasingly smaller.

These deviations with respect to the conditions along the remaining part of the circumference of the piston ring may be eliminated according to the present invention in that one seeks to obtain at the abutment ends an opposite torsion effect from that along the remaining part of the ring circumference. One thus counteracts the cross-sectional rotations or twistings conditioned by the torsion effect present along the main part of the ring and the vibrations at the abutment or joint ends and thus reaches a balanced wear picture.

Figure 4:
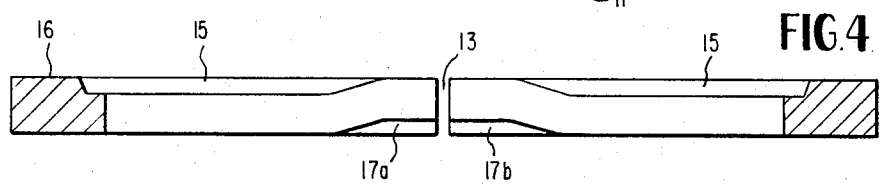
Figure 5:
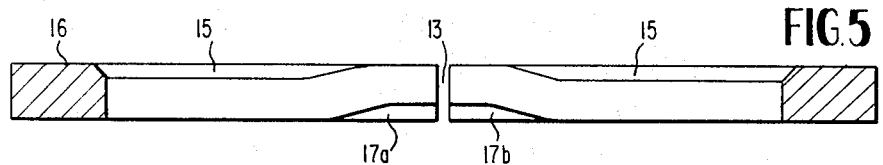
Figure 6:
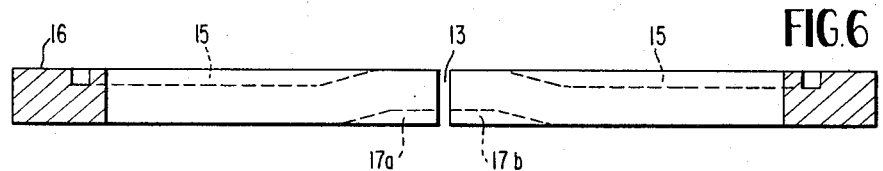

With the torsion rings illustrated in FIGURES 4 to 6 the annularly shaped recess 15 terminates in the upper flank surface 16 on both sides thereof prior to reaching the joint 13. In lieu thereof, corresponding apertures 17a and 17b are present at the lower inner edge of the ring within the area of the abutment or joint ends. The constructions according to FIGURES 4 to 6, however, entail the disadvantage that the upper and lower flank surfaces of the rings are reduced by the recesses.

Figure 7:
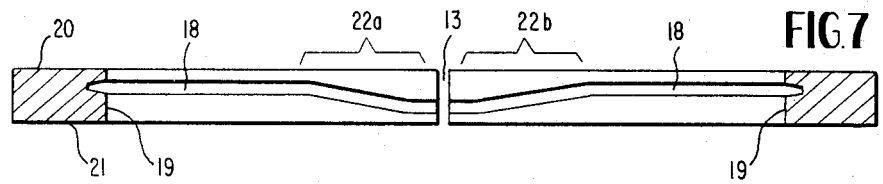

The torsion ring according to FIGURE 7 does not entail this disadvantage. By reason of the fact that the annular groove 18 extends exclusively along the inner surface 19 of the ring, the flank surfaces 20 and 21 are not reduced and impaired at all. This would also be of advantage for torsion rings with a groove extending completely around the ring at the same height. In the illustrated embodiment, the groove 18 extends within the areas 22a and 22b, which correspond to a sector angle 14a and 14b each of about 30°, obliquely downwardly from the top toward the bottom.

While I have shown and described several embodiments in accordance with the present invention, it is understood the same is not limited thereto but is susceptible of numerous changes and modifications as known to a person skilled in the art and I therefore do not wish to be limited to the details shown and described herein but intend to cover all such changes and modifications as are encompassed by the scope of the appended claims.

I claim:

1. A torsion piston ring having a substantially concentrically extending material recess along at least one of the surfaces meeting at the inner upper corner of the ring of originally rectangular cross-sectional area which extends over the major portion of the ring circumference, the material recess being displaced within the area of the ring ends toward the inner lower part of the cross-sectional surface of the ring.

2. A torsion piston ring according to claim 1, the material recess cutting into the upper flank surfaces of the ring and extending over the major part of the ring terminating at a point spaced from the ring ends, and the substantially corresponding displaced material recesses cutting into the lower flank surfaces of the ring up to the ring ends thereof.

3. A torsion piston ring according to claim 1, the material recess extending as a groove exclusively along the inner surface of the ring and being laid out in the direction toward the ring ends from an upper area to a lower area of the inner surface of the ring.

4. A torsion piston ring according to claim 3, the area within which the groove extends obliquely downwardly corresponding to a sector angle of between 10° to 40° as measured from the ring ends.

5. In a torsion piston ring having a substantially concentrically extending material recess along at least one of the surfaces meeting at the inner upper corner of the ring of originally rectangular cross-sectional area extending over a major portion of the ring circumference, the improvement essentially consisting of means for counteracting the torsional effect produced by said first-mentioned material recess.

6. In a torsion piston ring having a substantially concentrically extending material recess, the improvement essentially consisting of a first material recess portion along at least one of the surfaces meeting at the inner upper corner of the cross-sectional area of the ring which extends over a major portion of the ring circumference, and a second material recess portion within the area of each end of the ring which is disposed to the inner lower part of the ring cross-sectional area.

7. In a torsion piston ring according to claim 6, the first and second material recess portions extending as a groove exclusively along the inner surface of the ring and being so shaped in a direction toward the ring ends as to extend from an upper area to a lower area of the inner surface of the ring.

8. In a torsion piston ring having a substantially concentrically extending material recess along at least one of the surfaces meeting at the inner upper corner of the ring of originally rectangular cross-sectional area extending over a major portion of the ring circumference, the improvement essentially consisting of means constituted exclusively by displaced material recesses in the ring near the ends thereof for counteracting the torsional effect produced by said first-mentioned material recess.

9. A torsion annular piston ring being substantially cylindrical about an axis with a gap defined by closely adjacent ends, axially opposite top and bottom surfaces and radially opposite inner and outer surfaces, the improvement comprising: means for producing an unequal distribution of torque around the circumference of the ring and a generally symmetrical distribution of torque extending circumferentially away from said gap when the ring is assembled with a piston to counteract the absence of torsion resistance by the discontinuity at said gap; said means including an average cross-sectional area distribution within the range of 10–40° as measured circumferentially from the axis on each side of said gap that is substantially different from the average cross-sectional material distirbution circumferentially outside of said range.

10. The piston ring according to claim 9, wherein said means includes a material cross-section in the bottom portion of said ring that is generally substantially less, within the range of 10 to 40° as measured circumferentially from the axis on each side of said gap, than the material cross-section for the remaining bottom portion of the ring to produce a torque within said range generally counteracting the torque produced outside of said range.

11. The piston ring according to claim 10, wherein said means includes a material cross-section in the top portion of the ring that is generally substantially greater within the range of 10 to 40° as measured circumferentially from the axis on each side of said gap than the material cross-section for the remaining top portion of the ring to produce a torque within said range generally counteracting the torque produced outside of said range; and the material cross-section circumferentially outside of said range being substantially identical and uniform.

12. A piston ring according to claim 9, wherein said means includes a material cross-section in the top portion of the ring that is generally substantially greater within the range of 10 to 40° as measured circumferentially from the axis on each side of said gap than the material cross-section for the remaining top portion of the ring to produce a torque within said range generally counteracting the torque produced outside of said range.

13. A torsion annular piston ring, being substantially cylindrical about an axis with a gap defined by closely adjacent ends, axially opposite top and bottom surfaces, and radially opposite inner and outer surfaces, the improvement comprising; each of said top and bottom surfaces being substantially planar, parallel to each other and identical; means producing a torsional effect upon the cross-sections of said ring and including recess means only in the inner surface portion forming a cross-sectional material distribution substantially greater on one axial side of a midplane parallel to and midway between said top and bottom surfaces than the material distribution on the other axial side of said midplane for the majority of the ring circumference.

References Cited

UNITED STATES PATENTS 2,459,395   1/1949   Smith _____ 277—216

LAVERNE D. GEIGER, *Primary Examiner.*

D. MASSENBERG, *Assistant Examiner.*